(12) United States Patent
Kondo

(10) Patent No.: US 7,096,351 B2
(45) Date of Patent: Aug. 22, 2006

(54) SINGLE-CHIP MICROCOMPUTER AND BOOT REGION SWITCHING METHOD THEREOF

(75) Inventor: Takao Kondo, Kanagawa (JP)

(73) Assignee: NEC Electronics Corporation, (JP)

( * ) Notice: Subject to any disclaimer, the term of this patent is extended or adjusted under 35 U.S.C. 154(b) by 428 days.

(21) Appl. No.: 10/615,817

(22) Filed: Jul. 9, 2003

(65) Prior Publication Data
US 2004/0015671 A1  Jan. 22, 2004

(30) Foreign Application Priority Data
Jul. 10, 2002 (JP) ............................. 2002-201783

(51) Int. Cl.
*G06F 9/00* (2006.01)
*G06F 15/177* (2006.01)
*G06F 9/24* (2006.01)

(52) U.S. Cl. ............................... 713/100; 713/1; 713/2
(58) Field of Classification Search ..................... None
See application file for complete search history.

(56) References Cited

U.S. PATENT DOCUMENTS 5,974,544 A * 10/1999 Jeffries et al. ................. 713/1
6,018,629 A * 1/2000 Tojima ........................ 717/173
6,308,265 B1 * 10/2001 Miller ............................ 713/2
2001/0020263 A1  9/2001 Matsuura ..................... 711/103

FOREIGN PATENT DOCUMENTS

| JP | 08-255084 | 10/1996 |
| JP | 10-149282 | 6/1998 |
| JP | 2001-195241 | 7/2001 |

* cited by examiner

*Primary Examiner*—John R. Cottingham
*Assistant Examiner*—Stefan Stoynov
(74) *Attorney, Agent, or Firm*—Hayes Soloway P.C.

(57) ABSTRACT

With a plurality of memory blocks as a pair, a plurality of pairs of the memory blocks are provided and in a case where a pair of memory blocks is designated as a new boot region, when designating other pair of memory blocks as a boot region, a value obtained by subtracting a predetermined value from an initial value set at the boot area designation flag of the memory block of all the memory block pairs is stored in the boot area designation flag of each memory block of other memory block pair and at the time of booting the system, if values of the boot area designation flags in the memory blocks of other memory block pair are equal and not the initial value, determination is made that a boot program is stored in other memory block pair.

27 Claims, 7 Drawing Sheets

FIG.2C

| USER REGION | BOOT AREA DESIGNATION FLAG |
|---|---|
| 64 ▨ | FF |
| 63 NEW BOOT PROGRAM | FF |
| 62 | FF |
| 61 BOOT PROGRAM | FF |

FIG.2D

| USER REGION | BOOT AREA DESIGNATION FLAG |
|---|---|
| 64 ▨ | FF |
| 63 NEW BOOT PROGRAM | FE |
| 62 | FF |
| 61 BOOT PROGRAM | FF |

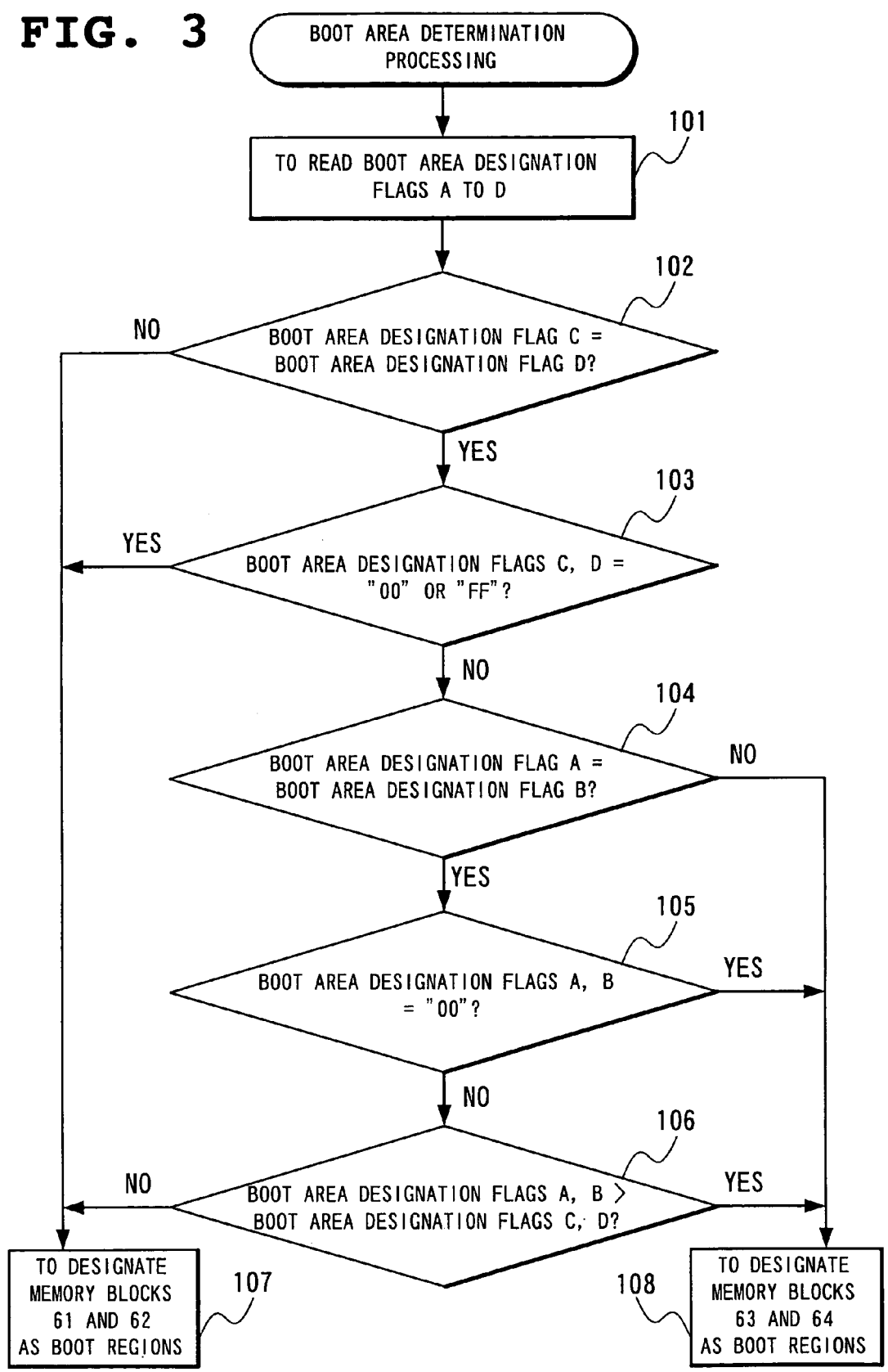

SINGLE-CHIP MICROCOMPUTER AND BOOT REGION SWITCHING METHOD THEREOF

BACKGROUND OF THE INVENTION

1. Field of the Invention

The present invention relates to a single-chip microcomputer having a CPU and a nonvolatile memory and, more particularly, to a boot region switching method of, when a certain region of a nonvolatile memory is designated as a boot region where a boot program is stored, switching other region to be a new boot region.

2. Description of the Related Art

Single-chip microcomputer (or single-chip micro) is a semiconductor device in which a storage region where a control program is stored and a CPU (central processing unit) for executing operation based on the control program are formed on one semiconductor chip.

In order to facilitate modification of a control program, some of such single-chip microcomputers employ nonvolatile memories including a flash memory as a memory for storing the control program.

Single-chip microcomputer mounted with such a flash memory, even when a control program stored in the flash memory needs to be modified, enables the once stored control program to be rewritten.

Among methods of rewriting such a control program are a writer rewriting mode for rewriting a control program by using a flash writer and a self-programming mode for rewriting a nonvolatile memory at the stage of user's use. The writer rewriting mode is a mode of controlling rewriting of a flash memory by starting instruction execution from a boot memory to communicate with the outside, while a user mode is a mode of executing a user region by similarly booting from a boot memory and then selecting a start address. In the self-programming mode, a boot program and other instructions necessary for rewriting are transferred from a nonvolatile memory or from the outside to a RAM to rewrite the nonvolatile memory based on the instruction read from the RAM. In the self-programming mode, only when rewriting a region containing a boot block, a boot program is required as writing data. A boot program is a program to be executed first at the time of system booting after the system is reset.

At the time of rewriting a certain memory block of a nonvolatile memory by the self-programming mode as described above or at the time of replacing a boot program with a new boot program, a boot region switching process is executed such that a boot program stored in the memory block in question is rewritten into another memory block or a new boot program is stored in another memory block, which causes the region in which the boot program is stored to change to a new boot region.

However, simply transferring a boot program stored in a user region of a certain memory block into a RAM, or erasing an original boot program and storing the boot program read from the RAM in a user region of another memory block might result in a single-chip microcomputer system not being able to continue with normal operation due to instantaneous cut-off of power or the like occurring during erasure of a user region of a nonvolatile memory in which programs, including a boot program (hereinafter referred to as a boot program), are stored. In another case, instantaneous cut-off of power might occur during new program writing after erasure, resulting in incomplete writing. In such cases, even when the system is reset to boot again, there are cases where a boot program has not been normally rewritten to disable re-booting. Therefore, the self-programming mode of rewriting a nonvolatile memory at a stage of user's use has a problem that a user region in which a boot program is stored can not be erased safely.

As a countermeasure which eliminates the problem, techniques for safely rewriting a user region in which a boot program is stored are disclosed in Japanese Patent Laying-Open (kokai) No. Heisei 8-255084 and Japanese Patent Laying-Open (kokai) No. Heisei 10-149282. This patent teaches the process of rewriting a program in a boot area, by copying an old boot program into a free user region to save the same, erasing storage contents of the boot area in question and then writing a new boot program into the area, and after confirming the end of the writing, erasing the old boot program copied into the free user region. Therefore, even when a situation occurs where writing a new program can not be executed completely due to instantaneous cut-off of power or the like, the system can be booted again by the old boot program to prevent the system from entering an unrecoverable state.

With the above-described methods, however, the number of actions is large such as copying of an old boot program into a free area and erasure of an old boot program when it becomes unnecessary, resulting in making procedures complicated and time-consuming.

Conventional single-chip microcomputer which solves the above-described problems is recited in Japanese Patent Laying-Open (kokai) No. 2001-195241.

The conventional single-chip microcomputer is designed to have a boot area designation flag provided for each user region to enable a boot program stored in a nonvolatile memory to be safely rewritten in an onboard mode at a stage of user's use by a less number of actions. Structure of the conventional single-chip microcomputer is shown in FIG. 4.

Boot area designation flag, which is provided for each memory block, is a flag for indicating that a boot program is stored in a user region of the memory block in question.

The conventional single-chip microcomputer includes, as illustrated in FIG. 4, a nonvolatile memory 41, a CPU 2, a boot memory 3, a region switching flag 4 and a RAM 5.

The nonvolatile memory 41, in which programs including a boot program are stored, is divided into two memory blocks 161 and 162. The memory block 161 is formed of a user region A for writing data such as a program code by a user and a region for storing a boot area designation flag A corresponding thereto and the memory block 162 is formed of a user region B and a region for storing a boot area designation flag B corresponding thereto.

The CPU 2 is a main processor which conducts control and operation according to a program stored in the nonvolatile memory 41. The CPU 2 conducts setting of the region switching flag 4 based on the contents of a boot area designation flag. The boot memory 3 has a function of booting the system according to a designated control mode. After the system is booted up, among the programs stored in the nonvolatile memory 41, the boot program is first processed. Rewriting of the boot program is executed by a flash writer when the computer is handled singly by a factory and is executed in a self mode when in an on-board mode at the stage of user's use. The region switching flag 4 has a function of designating a user region in which the boot program is stored at the time of system booting. The RAM 5 temporality stores necessary data in response to an instruction from the CPU 2.

With reference to the flow chart of FIG. 5, description will be made of a procedure of rewriting programs including a boot program in a user region in a self-programming mode in thus structured conventional single-chip microcomputer when the user region A of the memory block 161 is designated for booting (boot area designation flag A="0", the boot area designation flag B="1"). The nonvolatile memory 41 is designed that, when data contents are erased, "1" is stored in all the erased bits.

Here, the user region and the boot area designation flag of the memory block 161 are represented by the user region A and the boot area designation flag A, respectively, and the user region and the boot area designation flag of the memory block 162 are shown as the user region B and the boot area designation flag B, respectively.

The conventional rewriting process involves: first, erasing the storage contents of the user region B and the boot area designation flag B into which a boot program is newly written (Step 201); then, writing the new boot program into the user region B (Step 2002); next, writing data so as to make the boot area designation flag B have boot designation (data "0") (Step 203).

Then, the storage contents of the user region A and the boot area designation A (Step 204) are erased. At this time, nothing is written to the boot area designation flag A, and thus the data "1" remains the same. The next step is writing with a program other than the boot program into the erased user region A according to the necessity.

In the user mode, when the system is booted by resetting, the program is executed from the boot memory 3, based on which program values of the boot area designation flag A and the boot area designation flag B. These flags are read to determine which of the user region A and the user region B stores the new boot program. The program writes the data of the relevant user region into the region switching flag 4 and the region switching flag 4. The region switching flag 4 is set to read storage contents branched into the user regions in which the new boot program is stored at the time of system booting.

When instantaneous cut-off of power occurs after the end of Step 203 and before Step 204 ends, a plurality of user regions might be designated as a boot region. In such a case, any of the user regions, the user region A, for example, should be preferentially designated as a boot region.

In the conventional single-chip microcomputer, since setting a boot area designation flag and a region switching flag enables a user region including a boot program for booting the system to be switched, thereby enabling boot program rewriting in a nonvolatile memory to be executed always with the old boot program existing, even when rewriting fails to be completed due to instantaneous cut-off of power or the like at the time of rewriting in the self-mode, recovery is possible by further rewriting and rewriting is enabled with a less number of actions in a short period of time.

In such a conventional single-chip microcomputer, however, when instantaneous power cut-off occurs during erasure of the user region B, that is, during the processing of Step 201 in FIG. 5, the value of the boot area designation flag B becomes indefinite to have a valid value depending on situations. At this stage, however, processing of Step 202 for writing the new boot program into the user region B is yet to be completed. Therefore, when the system is reset to boot up, both the boot area designation flags A and B go valid and if setting is made here to preferentially designate the user region B as a boot region, such a problem occurs that a user region in which no boot program is stored might be designated as a boot region.

In a flash memory, in particular, pre-write is conducted of, before erasing written data, once executing writing to make a voltage level held in all the memory cells be the same level. Therefore, when instantaneous power cut-off or the like occurs during pre-write of a certain memory block, a boot area designation flag of the memory block might attain "1" which should be originally "0", or attain "0" which should be originally "1".

As a result, in the conventional single-chip microcomputer shown in FIG. 4 as well, such a problem possibly occurs that a memory block in which a boot program is stored can not be specified depending on timing when instantaneous cut-off of power occurs, which disables booting from the boot program. Then, when booting from the boot program is not executed, system operation might not be conducted normally to have erroneous operation.

The above-described conventional single-chip microcomputers have the shortcomings of instantaneous power cut-off or the like occurring during the boot program rewriting processing in the self-programming mode making booting from the boot program impossible.

SUMMARY OF THE INVENTION

An object of the present invention is to provide a single-chip microcomputer capable of booting from a boot program without fail even when instantaneous power cut-off or the like occurs during boot region switching processing in self-programming.

According to the first aspect of the invention, a single-chip microcomputer comprises a non-volatile memory having a plurality of memory block pairs as a combination of a plurality of memory blocks each formed of a user region for storing a program code by a user and a region for storing a boot area designation flag indicating that a boot program to be executed first at the time of system booting is stored in the user region, in which the boot program is stored in a user region of a memory block of a specific pair of memory blocks at an initial state where no boot region switching processing is conducted, a region switching flag for indicating in which memory block pair the boot program is stored in the user region among the plurality of pairs of memory blocks, and a control element for, when designating other pair of memory blocks not designated as a boot region as a new boot region, storing a value obtained by subtracting a predetermined value from an initial value set at the boot area designation flag of the memory block of all the memory block pairs in the boot area designation flag of each memory block of the other memory block pair and at the time of booting the system, if the values of the boot area designation flags in the memory blocks of the other memory block pair are equal and not the initial value, determining that the boot program is stored in the other memory block pair to set the region switching flag.

In the preferred construction, the control element, when the values of the boot area designation flags in the memory blocks of the other memory block pair are different or the initial value, determines that the boot area designation flag in question is invalid to determine that the boot program is stored in the user region of the memory block of the specific memory block pair.

In another preferred construction, the control element, when the values of the boot area designation flags in the memory blocks of the other memory block pair are equal and not the initial value, if values of the boot area designation flags in the memory blocks of the specific memory block pair are different, determines that the boot area designation flag in the memory block of the specific memory block pair is invalid to determine that the boot program is stored in the other memory block pair.

In another preferred construction, the control element, when the values of the boot area designation flags in the memory blocks of the other memory block pair are equal and not the initial value, if values of the boot area designation flags in the memory blocks of the specific memory block pair are equal, determines that the boot program is stored in a memory block of a memory block pair which stores a boot area designation flag whose value is smaller.

In another preferred construction, the control element, when the values of the boot area designation flags in the memory blocks of the other memory block pair are equal and not the initial value or "0", determines that the boot program is stored in the other memory block pair.

In another preferred construction, at the time of erasure, each memory block of the memory block pairs of the non-volatile memory has the user region and the boot area designation flag erased simultaneously.

According to the second aspect of the invention, a single-chip microcomputer comprises a non-volatile memory having a plurality of memory block pairs as a combination of a plurality of memory blocks each formed of a user region for storing a program code by a user and a region for storing a boot area designation flag indicating that a boot program to be executed first at the time of system booting is stored in the user region, in which the boot program is stored in a user region of a memory block of a specific memory block pair at an initial state where no boot region switching processing is conducted, a region switching flag for indicating in which memory block pair the boot program is stored in the user region among the plurality of pairs of memory blocks, and a control element for setting the region switching flag, wherein the control element when designating other memory block pair not designated as a boot region as a new boot region, stores a value obtained by subtracting a predetermined value from an initial value set at the boot area designation flag of the memory block of all the memory block pairs in the boot area designation flag of each memory block of the other memory block pair and at the time of booting the system, if the values of the boot area designation flags in the memory blocks of the other memory block pair are equal and not the initial value, determines that the boot program is stored in the other memory block pair, when the values of the boot area designation flags in the memory blocks of the other memory block pair are different or the initial value, determines that the boot area designation flag in question is invalid to determine that the boot program is stored in the user region of the memory block of the specific memory block pair, when the values of the boot area designation flags in the memory blocks of the other memory block pair are equal and not the initial value, if values of the boot area designation flags in the memory blocks of the specific memory block pair are different, determines that the boot area designation flag in the memory block of the specific memory block pair is invalid to determine that the boot program is stored in the other memory block pair, and when the values of the boot area designation flags in the memory blocks of the other memory block pair are equal and not the initial value, if the values of the boot area designation flags in the memory blocks of the specific memory block pair are equal, determines that the boot program is stored in a memory block of a memory block pair which stores a boot area designation flag whose value is smaller.

According to another aspect of the invention, in a single-chip microcomputer including a non-volatile memory having a plurality of memory block pairs as a combination of a plurality of memory blocks each formed of a user region for storing a program code by a user and a region for storing a boot area designation flag indicating that a boot program to be executed first at the time of system booting is stored in the user region, in which the boot program is stored in a user region of a memory block of a specific pair of memory blocks at an initial state where no boot region switching processing is conducted, and a CPU, a boot region designating method of the single-chip microcomputer of, when a user region of a memory block of a specific memory block pair is designated as a boot region in which the boot program is stored, switching a region of other memory block pair as a new boot region, comprising the steps of:

when designating other memory block pair not designated as a boot region as a new boot region, storing a value obtained by subtracting a predetermined value from an initial value set at the boot area designation flag of the memory block of all the memory block pairs in the boot area designation flag of each memory block of the other memory block pair, and at the time of booting the system, if the values of the boot area designation flags in the memory blocks of the other memory block pair are equal and not the initial value, determining that the boot program is stored in the other memory block pair.

In the preferred construction, the boot region designating method of the single-chip microcomputer comprises the step of, when the values of the boot area designation flags in the memory blocks of the other memory block pair are different or the initial value, determining that the boot area designation flag in question is invalid to determine that the boot program is stored in the user region of the memory block of the specific memory block pair.

In another preferred construction, the boot region designating method of the single-chip microcomputer comprises the step of, when the values of the boot area designation flags in the memory blocks of the other memory block pair are equal and not the initial value, if values of the boot area designation flags in the memory blocks of the specific memory block pair are different, determining that the boot area designation flag in the memory block of the specific memory block pair is invalid to determine that the boot program is stored in the other memory block pair.

In another preferred construction, the boot region designating method of the single-chip microcomputer comprises the step of, when the values of the boot area designation flags in the memory blocks of the other memory block pair are equal and not the initial value, if values of the boot area designation flags in the memory blocks of the specific memory block pair are equal, determining that the boot program is stored in a memory block of a memory block pair which stores a boot area designation flag whose value is smaller.

In another preferred construction, the boot region designating method of the single-chip microcomputer comprises the step of, when the values of the boot area designation flags in the memory blocks of the other memory block pair are equal and not the initial value or "0", determining that the boot program is stored in the other memory block pair.

According to another aspect of the invention, in a single-chip microcomputer including a non-volatile memory having a plurality of memory block pairs as a combination of a plurality of memory blocks each formed of a user region for storing a program code by a user and a region for storing a boot area designation flag indicating that a boot program to be executed first at the time of system booting is stored in the user region, in which the boot program is stored in a user region of a memory block of a specific pair of memory blocks at an initial state where no boot region switching processing is conducted, and a CPU, a boot region designating method of the single-chip microcomputer of, when a user region of a memory block of a specific memory block pair is designated as a boot region in which the boot program is stored, switching a region of other memory block pair as a new boot region, comprising the steps of when designating other memory block pair not designated as a boot region as a new boot region, storing a value obtained by subtracting a predetermined value from an initial value set at the boot area designation flag of the memory block of all the memory block pairs in the boot area designation flag of each memory block of the other memory block pair, at the time of booting the system, if the values of the boot area designation flags in the memory blocks of the other memory block pair are equal and not the initial value, determining that the boot program is stored in the other memory block pair, when the values of the boot area designation flags in the memory blocks of the other memory block pair are different or the initial value, determining that the boot area designation flag in question is invalid to determine that the boot program is stored in the user region of the memory block of the specific memory block pair, when the values of the boot area designation flags in the memory blocks of the other memory block pair are equal and not the initial value, if values of the boot area designation flags in the memory blocks of the specific memory block pair are different, determining that the boot area designation flag in the memory block of the specific memory block pair is invalid to determine that the boot program is stored in the other memory block pair, and when the values of the boot area designation flags in the memory blocks of the other memory block pair are equal and not the initial value, if values of the boot area designation flags in the memory blocks of the specific memory block pair are equal, determining that the boot program is stored in a memory block of a memory block pair which stores a boot area designation flag whose value is smaller.

According to another aspect of the invention, a boot region switching method of a microcomputer including a non-volatile memory having a first memory block and a second memory block formed of a program region and a boot area designation flag region, of the microcomputer, comprising the steps of when storing a new boot program in the nonvolatile memory instead of, the boot program, erasing data of the second memory block, storing the new boot program in the program region of the second memory block, storing data which are different from data stored in the boot area designation flag region of the first memory block in the boot area designation flag region of the second memory block, and erasing data of the first memory block.

In the preferred construction, when reading the boot program, reading the boot area designation flag from the first memory block and the second memory block, executing the boot program stored in the first memory block or the new boot program stored in the second memory block based on a comparison result of the boot area designation flag.

In another preferred construction, the boot area designation flag region of the second memory block including a first boot area designation flag region and a second boot area designation flag region, instead of the step of storing data which are different from data stored in the boot area designation flag region of the first memory block in the boot area designation flag region of the second memory block, storing data which are different from data stored in the boot area designation flag region of the first memory block in the first boot area designation flag region of the second memory block, storing same data as data of the boot area designation flag region of the first memory block in the second boot area designation flag region of the second memory block.

According to the present invention, since boot area designation flags of the same contents are stored in a plurality of regions which can not be erased simultaneously, even when instantaneous power cut-off occurs to make one boot area designation flag have an indefinite value, a value of other boot area designation flag is maintained to be normal. Therefore, detecting whether the two boot area designation flags are coincident with each other or not leads to determination whether the boot area designation flags are valid or invalid, so that erroneous operation can be prevented of designating a memory block in which no boot program is actually stored as a boot region.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2C is a diagram for use in explaining boot region switching processing in the single-chip microcomputer according to the first embodiment of the present invention;

FIG. 2D is a diagram for use in explaining boot region switching processing in the single-chip microcomputer according to the first embodiment of the present invention;

FIG. 3 is a flow chart showing operation of the single-chip microcomputer illustrated in FIG. 1;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
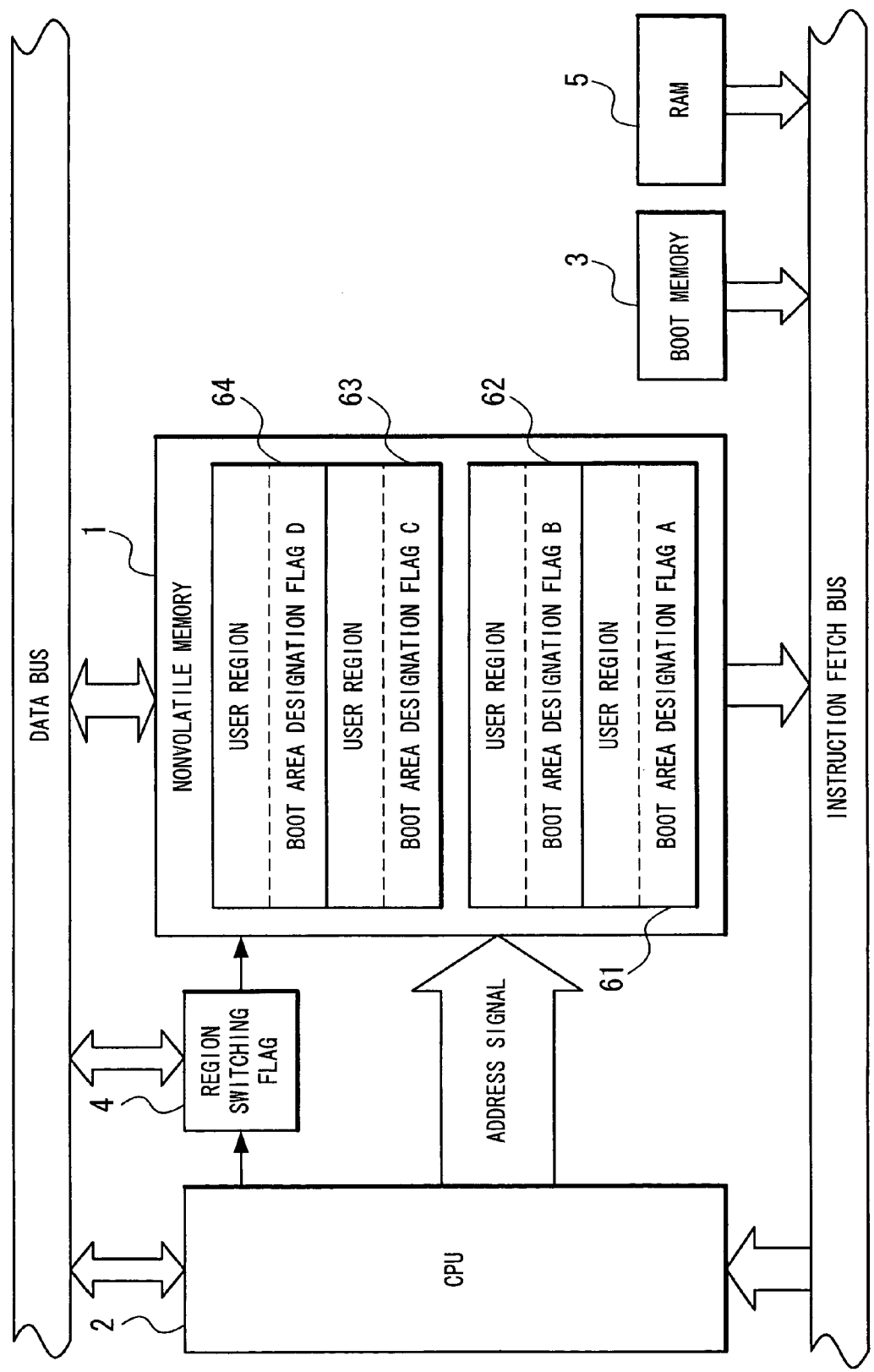
FIG. 1 is a block diagram showing a structure of a single-chip microcomputer according to a first embodiment of the present invention.

Next, embodiment of the present invention will be detailed with reference to the drawings. FIG. 1 is a block diagram showing a structure of a single-chip microcomputer according to a first embodiment of the present invention. In FIG. 1, the same components as those in FIG. 4 are given the same reference numerals and their description are omitted.

Figure 4:
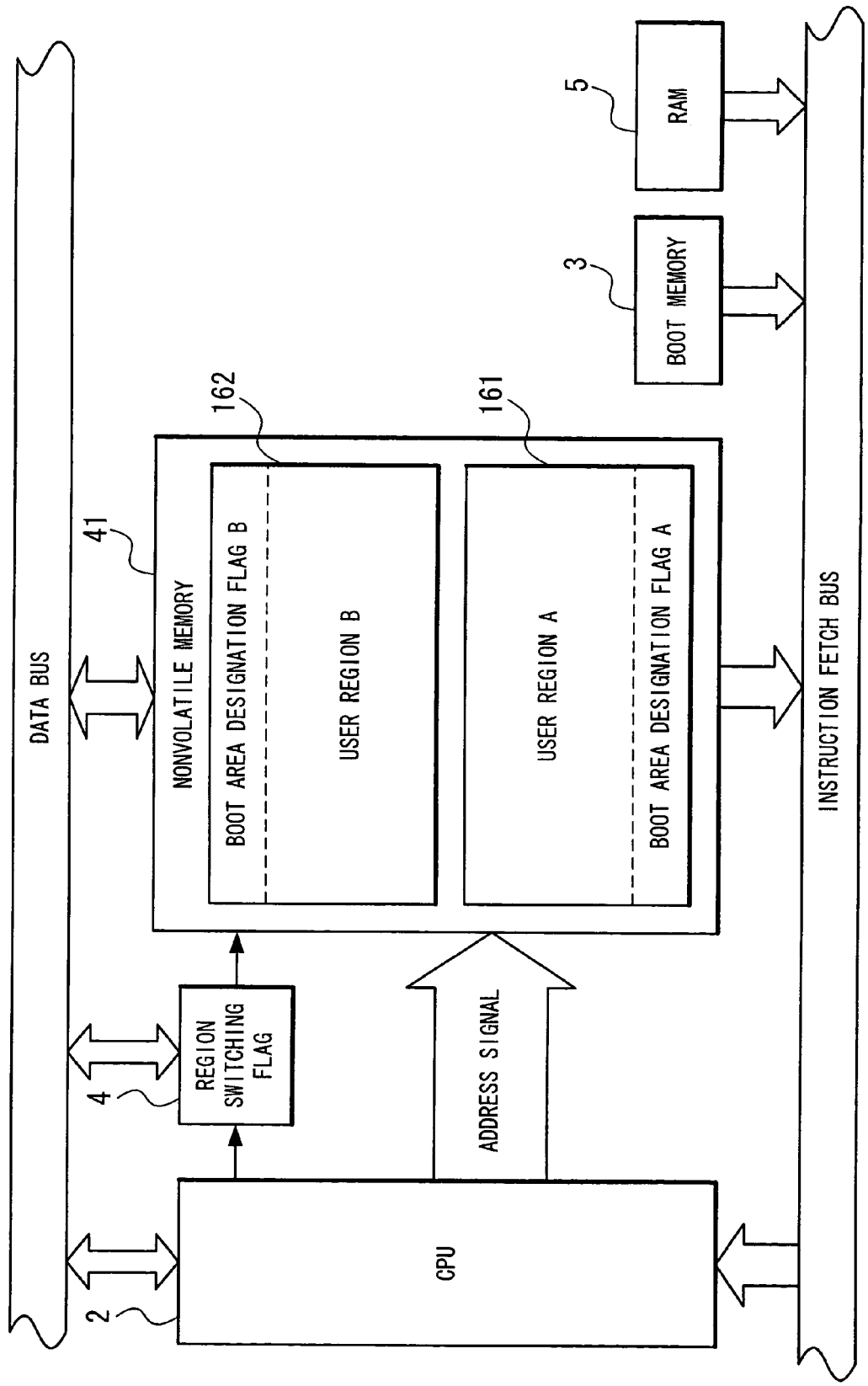
FIG. 4 is a block diagram showing a structure of a conventional single-chip microcomputer.
Figure 5:
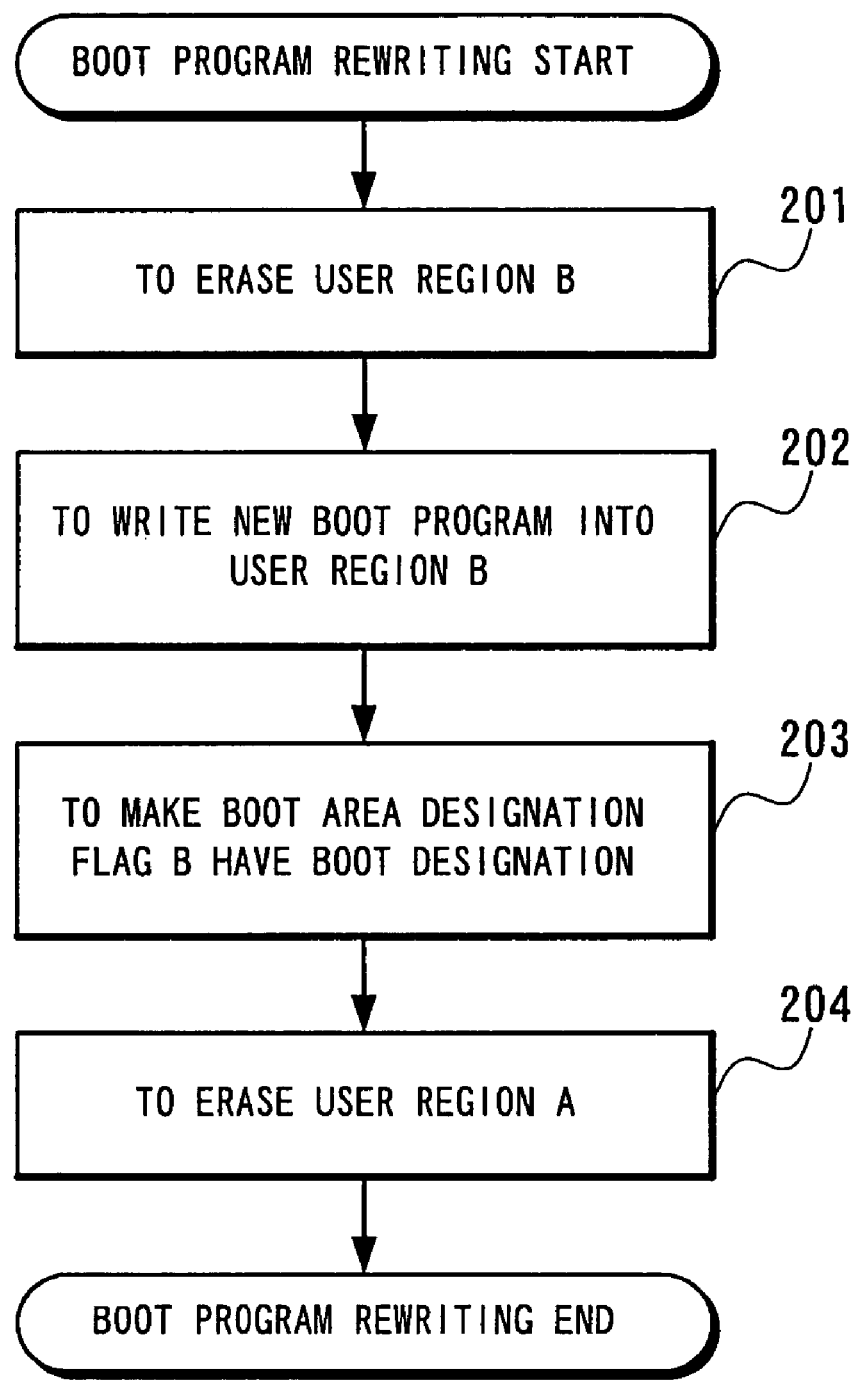
FIG. 5 is a flow chart showing operation of the conventional single-chip microcomputer illustrated in FIG. 4.

The single-chip microcomputer according to the present embodiment differs from the conventional single-chip microcomputer shown in FIG. 4 in that the nonvolatile memory 41 is replaced by a nonvolatile memory 1. In the present embodiment, description will be made of a case where a flash memory is used as a nonvolatile memory.

The nonvolatile memory 1 in the present embodiment is divided into four memory blocks 61 to 64. Then, each of the four memory blocks 61 to 64 is divided into a user region for writing data such as a program code by a user and a region for storing a boot area designation flag. In the present embodiment, description will be made assuming that the boot area designation flag is formed of 32 bits as an example.

In addition, assuming that boot designation which indicates a memory block in which a boot program is stored is conducted for every two memory blocks, boot designation is made here by designating a pair of memory blocks, the two memory blocks 61 and 62 or the memory blocks 63 and 64.

While in a conventional single-chip microcomputer, the boot area designation flag only indicates whether a boot program is stored in a block memory in question or not, in the single-chip microcomputer of the present embodiment, based on a value of the boot area designation flag, determination is made in which of the memory block pair the boot program is stored, the memory blocks 61 and 62 or the memory blocks 63 and 64.

The flash memory is designed such that when a certain memory block is erased, a boot area designation flag and data stored in a user region in the memory block are erased simultaneously to make it impossible to have only the data stored in any one of the regions remain. In addition, in any erasing method, erasure is internally conducted for every one memory block without fail.

A CPU 2 in the present embodiment determines in which of the memory block pairs, the two memory blocks 61 and 62 or the memory blocks 63 and 64, a boot program is stored which is to be executed when the system is reset next based on the values of the boot area designation flags stored in the respective memory blocks 61–64 and sets the determination result at the flag region switching flag 4.

Next, processing of switching a boot region which is conducted in the single-chip microcomputer according to the present embodiment will be described with reference to FIGS. 2A, 2B, 2C, 2D, 2E and 2F. In FIGS. 2A to 2F, the value of the boot area designation flag "FFFFFFFF (H: hexadecimal notation)" is represented simply as "FF", "FFFFFFFE(H)" simply as "FE" and "00000000(H)" simply as "00". Then, the boot region switching processing is conducted by the CPU 2.

Here, description will be made with respect to a case where a boot program stored in the user region of the memory block 61 is rewritten into the user region of the memory block 63. An initial value of the boot area designation flag (value at the erased state) is "FFFFFFFF(H)".

Figure 2A:
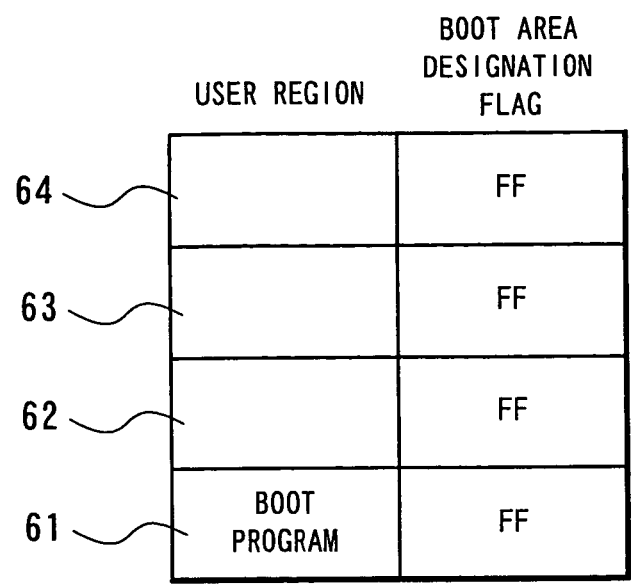
FIG. 2A is a diagram for use in explaining boot region switching processing in the single-chip microcomputer according to the first embodiment of the present invention.
Figure 2B:
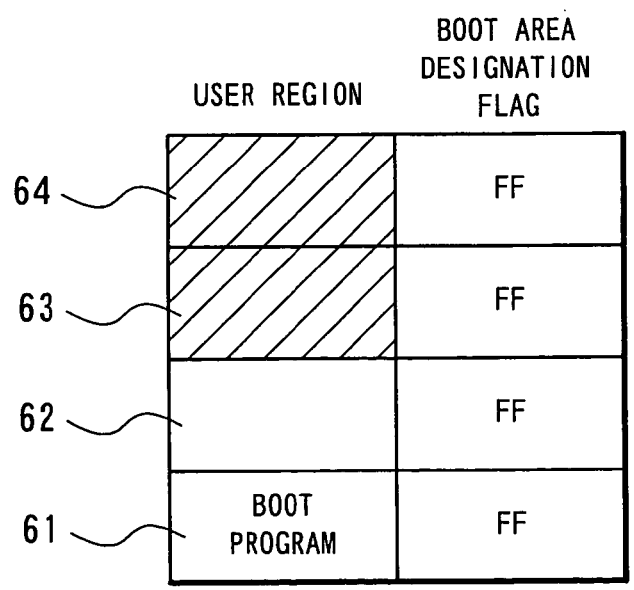
FIG. 2B is a diagram for use in explaining boot region switching processing in the single-chip microcomputer according to the first embodiment of the present invention.

State of the nonvolatile memory 1 before the boot region switching processing is conducted is shown in FIG. 2A. In FIG. 2A, the boot program is stored in the user region of the memory block 61 and each boot area designation flag of the memory blocks 61 to 64 indicates "FFFFFFFF(H)".

The boot region switching processing is conducted from the state shown in FIG. 2A by the following manner.

(1) First, erase the memory blocks 63 and 64 (FIG. 2B) to write a new boot program in the user region of the memory block 63 (FIG. 2C). The value of the boot area designation flag obtained when erasure is conducted changes once from "FFFFFFFF" to "00000000" and then again to "FFFFFFFF".

Figure 2E:
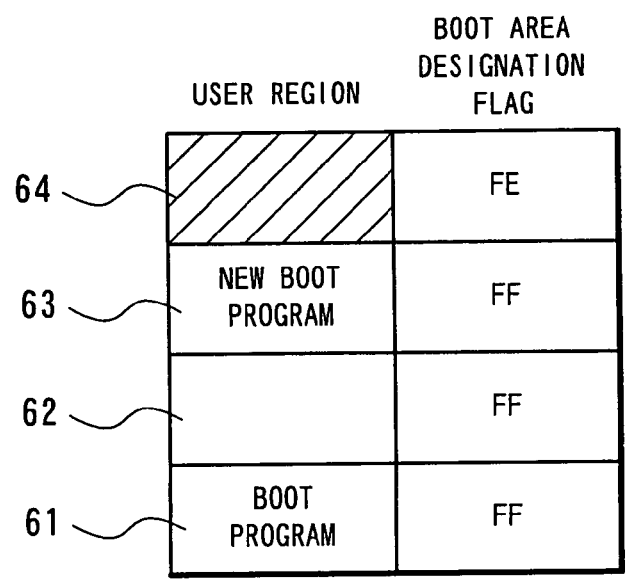
FIG. 2E is a diagram for use in explaining boot region switching processing in the single-chip microcomputer according to the first embodiment of the present invention.

(2) Next, as the boot area designation flag of the memory block 63, write "FFFFFFFE" which is a value obtained by decrementing "FFFFFFFF" by 1 (FIG. 2D) and thereafter as the boot area designation flag of the memory block 64, similarly write "FFFFFFFE" which is a value obtained by decrementing "FFFFFFFF" by 1 (FIG. 2E).

(3) Then, lastly, erase the memory blocks 61 and 62 to rewrite the data by the same manner as conventional one. In this processing, no rewriting is made of the boot area designation flags of the memory blocks 61 and 62.

Next, with reference to the flow chart shown in FIG. 3, description will be made of boot area determination processing in which the CPU 2 determines a pair of memory blocks where a boot program is stored based on a boot area designation flag value, which processing is conducted after thus executing the boot region switching processing. Here, the boot area designation flags of the memory blocks 61 to 64 are represented as boot area designation flags A to D, respectively.

First, after the boot region switching processing is completed, the CPU 2 reads the values of the boot area designation flags A to D from the memory blocks 61 to 64 (Step 101). Then, determination is made whether the value of the boot area designation flag C and that of the boot area designation flag D are equal (Step 102). When at Step 102 the values of the boot area designation flag C and the boot area designation flag D are not the same, which means that processing of switching the boot region to the memory blocks 63 and 64 fails to end normally, determination is made that a normal boot program is stored in the user regions of the memory blocks 61 and 62 to conduct boot designation of the memory blocks 61 and 62 (Step 107).

When at Step 102 the determination is made that the values of the boot area designation flag C and the boot area designation flag D are the same, determination is next made whether the values of the boot area designation flags C and D are "00000000" or "FFFFFFFF" (Step 103). When at Step 103 the values of the boot area designation flags C and D are "00000000" or "FFFFFFFF", determination is made that one abnormality or another occurs in the memory blocks 63 and 64 to conduct boot designation of the memory blocks 61 and 62 (Step 107).

Here, the reason why the determination can be made that one abnormality or another occurs when the values of the boot area designation flags C and D are "00000000" or "FFFFFFFF" is that when instantaneous power cut-off occurs during erasure processing of a certain memory block, it is highly probable that data being erased will be "FFFFFFFF" and when instantaneous power cut-off occurs during pre-writing in the course of erasure processing, it is highly probable that data being erased will be "00000000".

Then, when normal processing is being executed, it is hardly possible that the values of the boot area designation flags C and D attain "00000000" or "FFFFFFFF" because of the following reasons.

First, description will be made of a case where the values of the boot area designation flags C and D are "FFFFFFFF.

In a case where the boot program is stored at an initial state in any of the memory blocks 61 and 62, the boot program being stored in the memory blocks 63 and 64 means that the boot region switching processing has been conducted at least once, whereby the values of the boot area designation flags C and D can not remain "FFFFFFFF". Conversely, the values of the boot area designation flags C and D being "FFFFFFFF" means that the boot region switching processing has never been conducted, whereby determination can be made that the boot program is stored in the memory blocks 61 and 62.

Next, description will be made of a case where the values of the boot area designation flags C and D are "00000000". Although because the value of the boot area designation flag is decremented by one each from the initial value "FFFFFFFF" every time the boot region switching processing is conducted, it is possible to be "00000000" at the last, in a case, for example, where the boot area designation flag has 32 bits, "00000000" can not be attained unless the boot region switching processing is conducted $2^{32}$ times, so that it is impossible in practice to attain "00000000". As a result, when the value of the boot area designation flag is "00000000", the determination can be made that one abnormality or another occurs.

In other words, when all the bits forming the boot area designation flag are "0" or "1" except at the initial state, even if values of two boot area designation flags stored in a plurality of memory blocks coincide with each other, the CPU 2 determines that they are invalid.

When at Step 103, the values of the boot area designation flags C and D are neither "00000000" nor "FFFFFFFF", determination is made whether the value of the boot area designation flag A and that of the boot area designation flag B coincide with each other (Step 104). When at Step 104 the value of the boot area designation flag A and that of the boot area designation flag B fail to coincide with each other, because the processing of switching a boot region to the memory blocks 61 and 62 fail to end normally, the determination is made that a normal boot program is stored in the user regions of the memory blocks 61 and 62 to conduct boot designation of the memory blocks 63 and 64 (Step 108).

When at Step 104 the determination is made that the value of the boot area designation flag A and that of the boot area designation flag B coincide with each other, determination is next made whether the values of the boot area designation flag A and the boot area designation flag B are "00000000" or not (Step 105). When at Step 105 the values of the boot area designation flags A and B are "00000000", the determination is made that one abnormality or another occurs in the memory blocks 61 and 62 for the same reason as described above to conduct boot designation of the memory blocks 63 and 64 (Step 108).

Then, when at Step 105 the values of the boot area designation flags A and B are not "00000000", determination is made whether the values of the boot area designation flags A and B are larger than the values of the boot area designation flags C and D (Step 105). When at Step 105 the values of the boot area designation flags A and B are larger than the values of the boot area designation flags C and D, the determination is made that the boot program is stored in the user regions of the memory blocks 63 and 64 to conduct boot designation of the memory blocks 63 and 64 (Step 108). Conversely, when at Step 105 the values of the boot area designation flags A and B are smaller than the values of the boot area designation flags C and D, the determination is made that the boot program is stored in the user regions of the memory blocks 61 and 62 to conduct boot designation of the memory blocks 61 and 62 (Step 107).

The foregoing described processing enables the single-chip microcomputer of the present embodiment to specify a memory block in which a boot program is stored to boot the system from the boot program without fail even when instantaneous power cut-off occurs at any timing during self-programming.

In the flow chart shown in FIG. 3, the comparison is made between the value of the boot area designation flag and "00000000" or "FFFFFFFF", which comparison processing reduces a possibility that the values of two boot area designation flags will become indefinite to coincide with each other by chance due to instantaneous power cut-off or the like.

Description will be made with respect to, for example, a case where at the initial state of the single-chip microcomputer shown in FIG. 1, the boot program is stored only in the user region of the memory block 61 separately from the user region of the memory block 62. In such a case, if the boot region switching processing has never been conducted, all the values of the boot area designation flags A to D are the initial value "FFFFFFFF". When the self-programming processing is conducted from this state to rewrite the contents of the memory block 62, if instantaneous power cut-off occurs before the rewriting of the memory block 62 ends, the value of the boot area designation flag B of the memory block 62 becomes an indefinite value.

In this case, designating the memory blocks 63 and 64 as a boot region for the reason that the values of the boot area designation flags C and D are coincidently "FFFFFFFF" invites erroneous operation because the boot program is stored in the user region of the memory block 61 in practice. For preventing such a situation, the values of the boot area designation flags C and D and "FFFFFFFF" are compared in order to designate the memory blocks 61 and 62 as a boot region even in such a case.

In the single-chip microcomputer of the present embodiment, because the boot area designation flags of the same contents are stored in a plurality of regions which can not be erased simultaneously, even if instantaneous power cut-off occurs to make one of the boot area designation flags have an indefinite value, the value of the other boot area designation flag is maintained at a normal value. Therefore, determination whether two boot area designation flags are coincident or not leads to determination whether the boot area designation flag is valid or not, thereby preventing erroneous operation of designating a memory block in which no boot program is actually stored as a boot region.

Consideration will be given, for example, where during erasing processing of the memory blocks 63 and 64, instantaneous power cut-off occurs to make the data in the memory blocks 63 and 64 indefinite. In this case, even if either one of the boot area designation flags of the memory blocks 63 and 64 has a value smaller than "FFFFFFFF", unless the value of the other boot area designation flag has the same value, none of the memory blocks 63 and 64 is erroneously designated as a boot region. Probability that values of the two boot area designation flags coincide with each other by chance is $1/2^{32}$ in a case where the boot area designation flag has 32 bits, which is too low to actually occur.

Figure 2F:
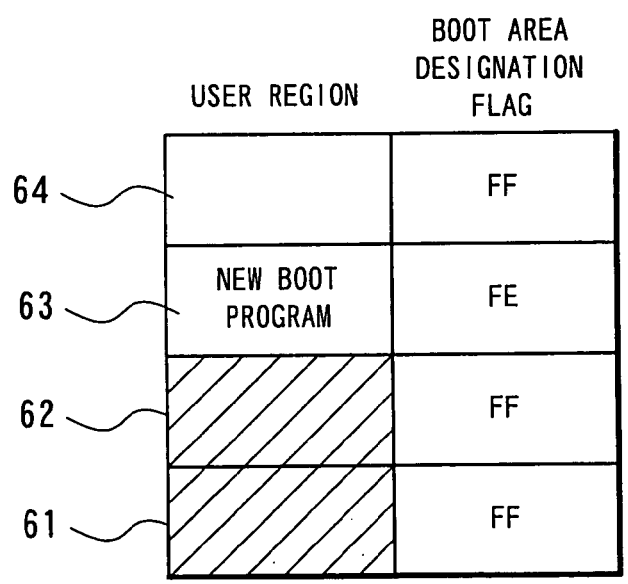
FIG. 2F is a diagram for use in explaining boot region switching processing in the single-chip microcomputer according to the first embodiment of the present invention.

In addition, also when instantaneous power cut-off occurs during erasing processing of the memory blocks 61 and 62 to make the data in the memory blocks 61 and 62 indefinite as shown in FIG. 2F, erroneous operation can not occur in practice for the same reason.

Although the present embodiment has been described with respect to a case where the number of memory blocks is four for the simplicity of description, the present invention is not limited thereto and the number of the memory blocks should be at least not less than four to have the present invention be applied. In this case, it is necessary that boot area designation flags of the same contents are stored in a plurality of memory blocks.

Moreover, although in the present embodiment, a storage region is divided into four memory blocks, each of which memory blocks is further divided into a region for storing a boot area designation flag and a user region to store boot area designation flags of the same contents in two different regions, the same effect can be obtained by any arrangement of storing boot area designation flags of the same contents in not less than two regions which can not be erased simultaneously.

As described in the foregoing, according to the present invention, since boot area designation flags of the same contents are stored in a plurality of memory blocks which can not be erased simultaneously, even when instantaneous power cut-off occurs during the boot region switching processing in self-programming, a memory block in which a boot program is stored can be specified to boot the system from the boot program.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A single-chip microcomputer comprising:
a non-volatile memory having a plurality of memory block pairs as a combination of a plurality of memory blocks each formed of a user region for storing a program code by a user and a region for storing a boot area designation flag indicating that a boot program to be executed first at the time of system booting is stored in said user region, in which the boot program is stored in a user region of a memory block of a specific pair of memory blocks at an initial state where no boot region switching processing is conducted,
a region switching flag for indicating in which memory block pair the boot program is stored in the user region among said plurality of pairs of memory blocks, and
a control element for, when designating other pair of memory blocks not designated as a boot region as a new boot region, storing a value obtained by subtracting a predetermined value from an initial value set at said boot area designation flag of the memory block of all said memory block pairs in the boot area designation flag of each memory block of said other memory block pair and at the time of booting the system, if the values of the boot area designation flags in the memory blocks of said other memory block pair are equal and not the initial value, determining that the boot program is stored in said other memory block pair to set said region switching flag.

2. The single-chip microcomputer as set forth in claim 1, wherein
said control element,
when the values of the boot area designation flags in the memory blocks of said other memory block pair are different or the initial value, determines that the boot area designation flag in question is invalid to determine that the boot program is stored in the user region of the memory block of said specific memory block pair.

3. The single-chip microcomputer as set forth in claim 1, wherein
said control element,
when the values of the boot area designation flags in the memory blocks of said other memory block pair are equal and not the initial value,
if values of the boot area designation flags in the memory blocks of said specific memory block pair are different, determines that the boot area designation flag in the memory block of said specific memory block pair is invalid to determine that the boot program is stored in said other memory block pair.

4. The single-chip microcomputer as set forth in claim 1, wherein
said control element,
when the values of the boot area designation flags in the memory blocks of said other memory block pair are equal and not the initial value, if values of the boot area designation flags in the memory blocks of said specific memory block pair are equal, determines that the boot program is stored in a memory block of a memory block pair which stores a boot area designation flag whose value is smaller.

5. The single-chip microcomputer as set forth in claim 1, wherein
said control element,
when the values of the boot area designation flags in the memory blocks of said other memory block pair are equal and not the initial value or "0", determines that the boot program is stored in said other memory block pair.

6. The single-chip microcomputer as set forth in claim 1, wherein
at the time of erasure, each memory block of said memory block pairs of said non-volatile memory has said user region and said boot area designation flag erased simultaneously.

7. A single-chip microcomputer comprising:
a non-volatile memory having a plurality of memory block pairs as a combination of a plurality of memory blocks each formed of a user region for storing a program code by a user and a region for storing a boot area designation flag indicating that a boot program to be executed first at the time of system booting is stored in said user region, in which the boot program is stored in a user region of a memory block of a specific memory block pair at an initial state where no boot region switching processing is conducted,
a region switching flag for indicating in which memory block pair the boot program is stored in the user region among said plurality of pairs of memory blocks, and
a control element for setting said region switching flag, wherein
said control element
when designating other memory block pair not designated as a boot region as a new boot region, stores a value obtained by subtracting a predetermined value from an initial value set at said boot area designation flag of the memory block of all said memory block pairs in the boot area designation flag of each memory block of said other memory block pair and at the time of booting the system, if the values of the boot area designation flags in the memory blocks of said other memory block pair are equal and not the initial value, determines that the boot program is stored in said other memory block pair, when the values of the boot area designation flags in the memory blocks of said other memory block pair are different or the initial value, determines that the boot area designation flag in question is invalid to determine that the boot program is stored in the user region of the memory block of said specific memory block pair, when the values of the boot area designation flags in the memory blocks of said other memory block pair are equal and not the initial value, if values of the boot area designation flags in the memory blocks of said specific memory block pair are different, determines that the boot area designation flag in the memory block of said specific memory block pair is invalid to determine that the boot program is stored in said other memory block pair, and when the values of the boot area designation flags in the memory blocks of said other memory block pair are equal and not the initial value, if the values of the boot area designation flags in the memory blocks of said specific memory block pair are equal, determines that the boot program is stored in a memory block of a memory block pair which stores a boot area designation flag whose value is smaller.

8. In a single-chip microcomputer including a non-volatile memory having a plurality of memory block pairs as a combination of a plurality of memory blocks each formed of a user region for storing a program code by a user and a region for storing a boot area designation flag indicating that a boot program to be executed first at the time of system booting is stored in said user region, in which the boot program is stored in a user region of a memory block of a specific pair of memory blocks at an initial state where no boot region switching processing is conducted, and a CPU, a boot region designating method of the single-chip microcomputer of, when a user region of a memory block of a specific memory block pair is designated as a boot region in which the boot program is stored, switching a region of other memory block pair as a new boot region, comprising the steps of:

when designating other memory block pair not designated as a boot region as a new boot region, storing a value obtained by subtracting a predetermined value from an initial value set at said boot area designation flag of the memory block of all said memory block pairs in the boot area designation flag of each memory block of said other memory block pair, and at the time of booting the system, if the values of the boot area designation flags in the memory blocks of said other memory block pair are equal and not the initial value, determining that the boot program is stored in said other memory block pair.

9. The boot region designating method of the single-chip microcomputer as set forth in claim 8, comprising the step of, when the values of the boot area designation flags in the memory blocks of said other memory block pair are different or the initial value, determining that the boot area designation flag in question is invalid to determine that the boot program is stored in the user region of the memory block of said specific memory block pair.

10. The boot region designating method of the single-chip microcomputer as set forth in claim 8, comprising the step of, when the values of the boot area designation flags in the memory blocks of said other memory block pair are equal and not the initial value, if values of the boot area designation flags in the memory blocks of said specific memory block pair are different, determining that the boot area designation flag in the memory block of said specific memory block pair is invalid to determine that the boot program is stored in said other memory block pair.

11. The boot region designating method of the single-chip microcomputer as set forth in claim 8, comprising the step of, when the values of the boot area designation flags in the memory blocks of said other memory block pair are equal and not the initial value, if values of the boot area designation flags in the memory blocks of said specific memory block pair are equal, determining that the boot program is stored in a memory block of a memory block pair which stores a boot area designation flag whose value is smaller.

12. The boot region designating method of the single-chip microcomputer as set forth in claim 8, comprising the step of, when the values of the boot area designation flags in the memory blocks of said other memory block pair are equal and not the initial value or "0", determining that the boot program is stored in said other memory block pair.

13. In a single-chip microcomputer including a non-volatile memory having a plurality of memory block pairs as a combination of a plurality of memory blocks each formed of a user region for storing a program code by a user and a region for storing a boot area designation flag indicating that a boot program to be executed first at the time of system booting is stored in said user region, in which the boot program is stored in a user region of a memory block of a specific pair of memory blocks at an initial state where no boot region switching processing is conducted, and a CPU, a boot region designating method of the single-chip microcomputer of, when a user region of a memory block of a specific memory block pair is designated as a boot region in which the boot program is stored, switching a region of other memory block pair as a new boot region, comprising the steps of:

when designating other memory block pair not designated as a boot region as a new boot region, storing a value obtained by subtracting a predetermined value from an initial value set at said boot area designation flag of the memory block of all said memory block pairs in the boot area designation flag of each memory block of said other memory block pair, at the time of booting the system, if the values of the boot area designation flags in the memory blocks of said other memory block pair are equal and not the initial value, determining that the boot program is stored in said other memory block pair, when the values of the boot area designation flags in the memory blocks of said other memory block pair are different or the initial value, determining that the boot area designation flag in question is invalid to determine that the boot program is stored in the user region of the memory block of said specific memory block pair, when the values of the boot area designation flags in the memory blocks of said other memory block pair are equal and not the initial value, if values of the boot area designation flags in the memory blocks of said specific memory block pair are different, determining that the boot area designation flag in the memory block of said specific memory block pair is invalid to determine that the boot program is stored in said other memory block pair, and when the values of the boot area designation flags in the memory blocks of said other memory block pair are equal and not the initial value, if values of the boot area designation flags in the memory blocks of said specific memory block pair are equal, determining that the boot program is stored in a memory block of a memory block pair which stores a boot area designation flag whose value is smaller.

14. A boot region switching method of a microcomputer that has a non-volatile memory, said nonvolatile memory having a first memory block and a second memory block, and each of said first and second memory blocks being formed of a program region and a boot area designation flag region, said method comprising the steps of:

storing a new boot program in said non-volatile memory instead of an original boot program by:

erasing data in said second memory block, storing said new boot program in said program region of said second memory block, storing data, different from data stored in said boot area designation flag region of said first memory block, in said boot area designation flag region of said second memory block, and erasing data in said first memory block.

15. A boot region switching method of a microcomputer as set forth in claim 14, wherein when said boot program is read by:

reading said boot area designation flag from each of said first memory block and said second memory block, executing said boot program stored in said first memory block or said new boot program stored in said second memory block based on a comparison result of said boot area designation flag from said first memory block and said boot area designation flag from said second memory block.

16. A boot region switching method of a microcomputer that has a non-volatile memory, said nonvolatile memory having a first memory block and a second memory block, and each of said first and second memory blocks being formed of a program region and a boot area designation flag region, wherein said boot area designation flag region of said second memory block includes a first boot area designation flag region and a second boot area designation flag region, said method comprising the steps of:

when storing a new boot program in said non-volatile memory instead of an original boot program by:

erasing data in said second memory block, storing said new boot program in said program region of said second memory block, storing data which are different from data stored in said boot area designation flag region of said first memory block in said first boot area designation flag region of said second memory block, storing same data as data of said boot area designation flag region of said first memory block in said second boot area designation flag region of said second memory block.

17. A single-chip microcomputer comprising:

a non-volatile memory having a plurality of memory block pairs, each memory block pair formed of a plurality of memory blocks, and each memory block having a user region for storing a program code by a user and a boot area designation flag indicating that a boot program to be executed when a system boot is stored in said user region, said boot program is stored in a user region of a memory block of a specific pair of memory blocks at an initial state, a region switching flag indicating which of said memory block pair stores said boot program, and a control element for, when designating another pair of memory blocks not designated as the specific memory block pair initially storing said boot program as a new pair of memory blocks to store the boot program, storing a value, obtained by subtracting a predetermined value from an initial value of said boot area designation flags of the memory blocks in all of memory block pairs, in the boot area designation flags of each memory block of said another memory block pair, wherein when booting the system, if the values of the boot area designation flags in the memory blocks of said another memory block pair are equal and not the initial value, determining that the boot program is stored in said another memory block pair and setting said region switching flag.

18. The single-chip microcomputer as set forth in claim 17, wherein when the values of the boot area designation flags in the memory blocks of said another memory block pair are different or the initial value, said control element determines that the boot area designation flag is invalid and determines that the boot program is stored in the user region of the memory block of said specific memory block pair.

19. The single-chip microcomputer as set forth in claim 17, wherein when the values of the boot area designation flags in the memory blocks of said another memory block pair are equal and not the initial value, and if values of the boot area designation flags in the memory blocks of said specific memory block pair are different, said control element determines that the boot area designation flag in the memory block of said specific memory block pair is invalid, and determines that the boot program is stored in said another memory block pair.

20. The single-chip microcomputer as set forth in claim 17, wherein when the values of the boot area designation flags in the memory blocks of said another memory block pair are equal and not the initial value, and if values of the boot area designation flags in the memory blocks of said specific memory block pair are equal, said control element determines that the boot program is stored in a memory block of either one of a memory block pair that stores a smaller value for said boot area designation flag.

21. The single-chip microcomputer as set forth in claim 17, wherein when the values of the boot area designation flags in the memory blocks of said another memory block pair are equal and not the initial value or "0", said control element determines that the boot program is stored in said another memory block pair.

22. The single-chip microcomputer as set forth in claim 17, wherein
at the time of erasure, each memory block of said memory block pairs of said non-volatile memory has said user region and said boot area designation flag erased simultaneously.

23. In a single-chip microcomputer including: a non-volatile memory having a plurality of memory block pairs, said memory block pairs having a plurality of memory blocks, said memory blocks each formed of a user region for storing a program code by a user and a boot area designation flag indicating that a boot program to be executed at system booting is stored in said user region, wherein the boot program is stored in a user region of a specific memory block of a specific pair of memory blocks at an initial state; and a CPU, a boot region designating method of the single-chip microcomputer for switching between a user region of a memory block of said specific memory block pair designated as a boot region in which the boot program is stored and a user region of another memory block pair, comprising the steps of:
storing a value, obtained by subtracting a predetermined value from an initial value set at said boot area designation flag of the memory block of all of said memory block pairs, in the boot area designation flag of each memory block of said another memory block pair, when designating other memory block pair not designated as a boot region as a new boot region, and
determining that the boot program is stored in said other memory block pair, if the values of the boot area designation flags in the memory blocks of said another memory block pair are equal and not the initial value, when the system initially boots.

24. The boot region designating method of the single-chip microcomputer as set forth in claim 23, further comprising the step of,
determining that the boot area designation flag in question is invalid, when the values of the boot area designation flags in the memory blocks of said another memory block pair are different or the initial value, so as to determine that the boot program is stored in the user region of the memory block of said specific memory block pair.

25. The boot region designating method of the single-chip microcomputer as set forth in claim 23, comprising the step of,
determining that the boot area designation flag in the memory block of said specific memory block pair is invalid when the values of the boot area designation flags in the memory blocks of said another memory block pair are equal and not the initial value, and if values of the boot area designation flags in the memory blocks of said specific memory block pair are different, so as to determine that the boot program is stored in said another memory block pair.

26. The boot region designating method of the single-chip microcomputer as set forth in claim 23, comprising the step of,
determining that the boot program is stored in a memory block of a memory block pair which stores a smaller value in said boot area designation flag, when the values of the boot area designation flags in the memory blocks of said another memory block pair are equal and not the initial value, and if values of the boot area designation flags in the memory blocks of said specific memory block pair are equal.

27. The boot region designating method of the single-chip microcomputer as set forth in claim 23, comprising the step of,
determining that the boot program is stored in said another memory block pair, when the values of the boot area designation flags in the memory blocks of said other memory block pair are equal and not the initial value or "0".

* * * * *